(12) United States Patent
Gruhler et al.

(10) Patent No.: US 8,127,602 B2
(45) Date of Patent: Mar. 6, 2012

(54) MEASURING DEVICE FOR DETERMINING AND/OR MONITORING THE AMOUNT OF CONTENTS IN A CONTAINER

(75) Inventors: Holger Gruhler, Tuningen (DE); Gerd Ohmayer, Haslach (DE); Martin Mellert, Steinach (DE); Joern Jacob, Kirnbach (DE)

(73) Assignee: Vega Grieshaber KG, Wolfach (DE)

( * ) Notice: Subject to any disclaimer, the term of this patent is extended or adjusted under 35 U.S.C. 154(b) by 552 days.

(21) Appl. No.: 12/230,546

(22) Filed: Aug. 29, 2008

(65) Prior Publication Data

US 2009/0071246 A1   Mar. 19, 2009

Related U.S. Application Data

(60) Provisional application No. 60/935,772, filed on Aug. 30, 2007.

(30) Foreign Application Priority Data

Aug. 30, 2007  (DE) .................. 10 2007 041 349

(51) Int. Cl.
*G01F 23/00*  (2006.01)
(52) U.S. Cl. ..................................... 73/290 V
(58) Field of Classification Search ............... 73/290 V; 340/621; 342/908, 224, 124; 702/56
See application file for complete search history.

(56) References Cited

U.S. PATENT DOCUMENTS

| | | | | |
|---|---|---|---|---|
| 5,408,168 A | * | 4/1995 | Pfandler | 318/642 |
| 2005/0210954 A1 | | 9/2005 | Raffalt | |
| 2008/0105049 A1 | * | 5/2008 | Woehrle et al. | 73/290 V |

FOREIGN PATENT DOCUMENTS

| | | |
|---|---|---|
| CN | 1673766 A | 9/2005 |
| DE | 39 12 038 A1 | 10/1990 |
| DE | 42 03 715 A1 | 8/1993 |
| DE | 195 23 461 C1 | 7/1996 |
| DE | 10 2004 033 311 A1 | 1/2006 |
| EP | 0 810 423 A2 | 12/1997 |
| EP | 1 580 539 A1 | 9/2005 |
| JP | 61-130821 A | 6/1986 |
| WO | WO 01/88490 A1 | 11/2001 |

OTHER PUBLICATIONS

Chinese Office Action, Application No. CN 200810213094.5, issued Aug. 31, 2011.

* cited by examiner

*Primary Examiner* — Hezron E Williams
*Assistant Examiner* — Tamiko Bellamy
(74) *Attorney, Agent, or Firm* — The Nath Law Group; Jerald L. Meyer; Jiaxiao Zhang

(57) ABSTRACT

A fill-measuring device for determining and/or monitoring the fill level of a container, includes: a membrane (1) which can be caused to vibrate; a rigid membrane rim (2) in which the membrane (1) is disposed; a drive device (4) having a drive end face (5) to impel the membrane (1) into vibration, and/or to convert vibrations of the membrane (1) into an electrical signal; and an attaching device (13) for attaching the drive device (4) to the membrane rim (2); wherewith, according to the invention: a part of the attaching device (13) is disposed in a region extending between the membrane (1) and the drive end face (5) of the drive device (4); and at least one pressure transmission element (6) is disposed between the membrane (1) and the drive end face (5) of the drive device (4), in a manner such that the membrane (1) and the drive end face (5) are coupled together for purposes of transmission of vibration.

19 Claims, 3 Drawing Sheets

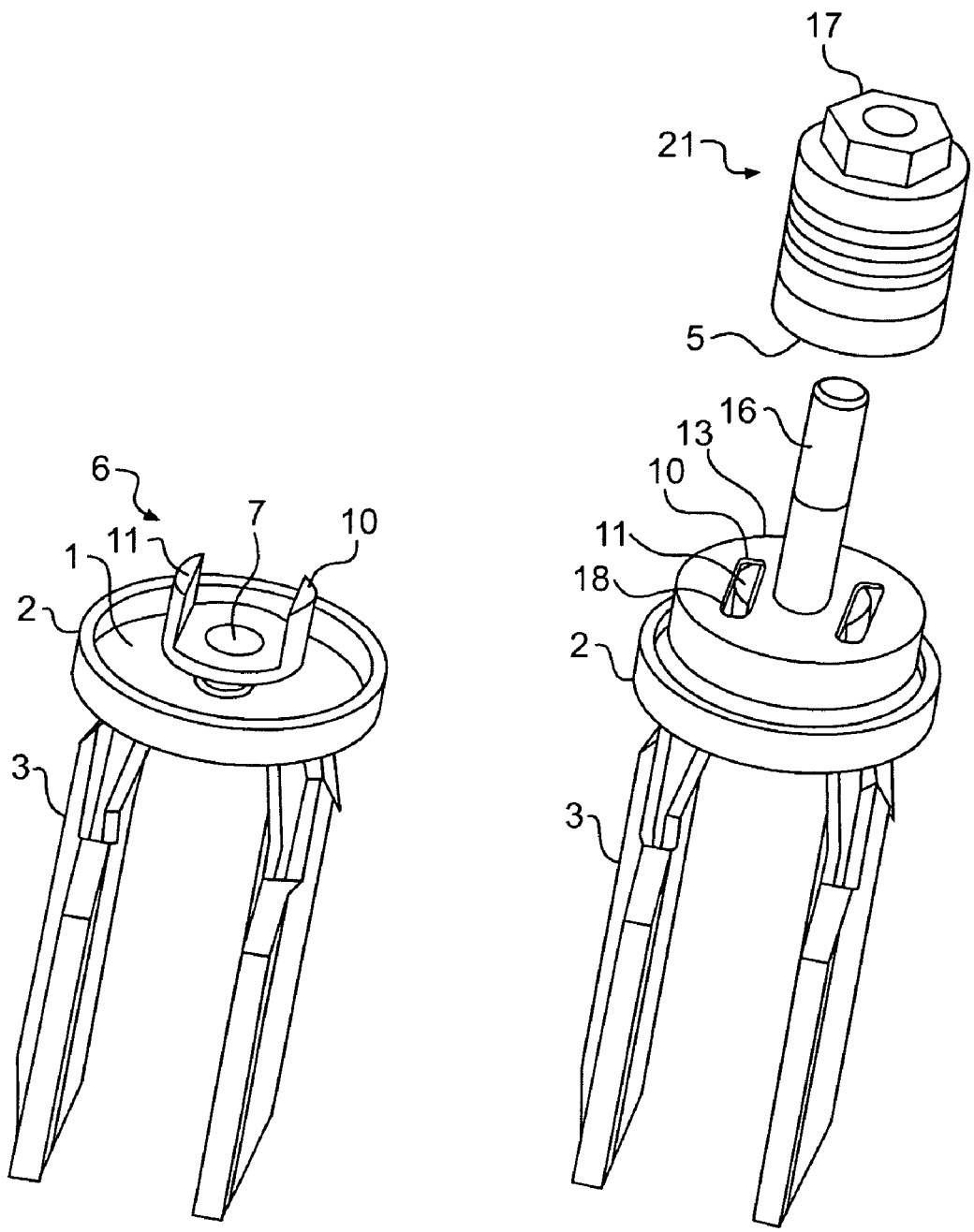

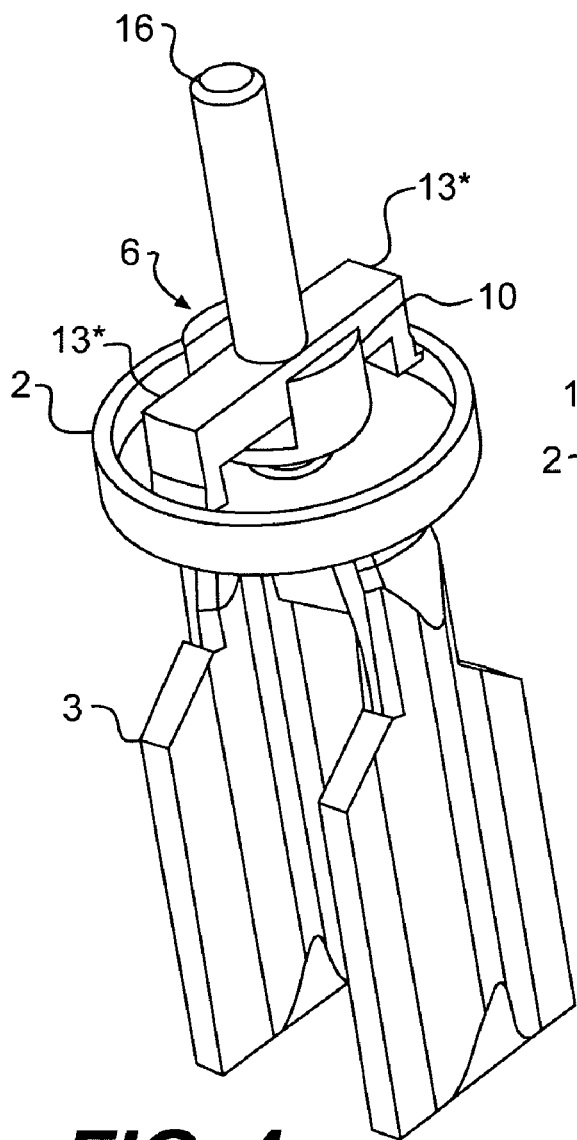
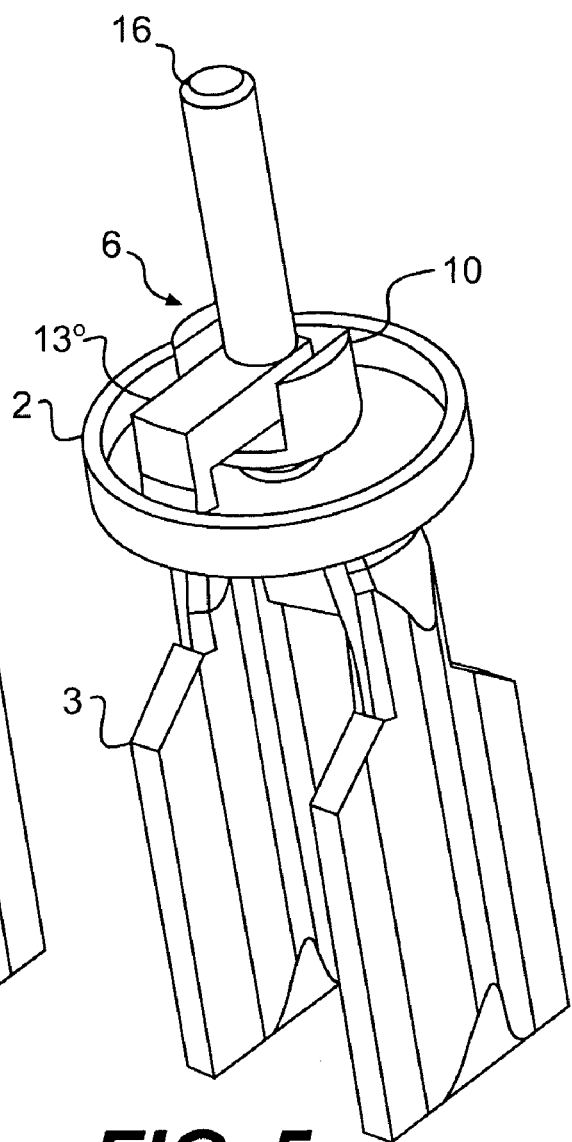
FIG. 4
FIG. 5

MEASURING DEVICE FOR DETERMINING AND/OR MONITORING THE AMOUNT OF CONTENTS IN A CONTAINER

This is a Non-Provisional application of U.S. Provisional Patent Application Ser. No. 60/935,772, filed on Aug. 30, 2007, the entire content of which is hereby incorporated by reference in its entirety.

The present disclosure relates to a measuring device for determining and/or monitoring the amount of contents in a container (the fill level of a container), having a fill-measuring device for determining and/or monitoring the fill level of a container.

Numerous types of fill-level measuring devices for determining and/or monitoring the amount of contents in a pipe or container are known. In particular, fill-measuring devices are known which make use of a membrane which can be caused to vibrate, which membrane is disposed in a rigid membrane rim. The membrane rim may be a component of a housing of the fill-measuring device, or may be attached to such a housing. Typically, such fill-measuring devices have a "drive device" with a drive device end face which acts on the membrane to impel said membrane into vibration and/or which serves to receive vibrations of the membrane and convert them into an electrical signal. In order to facilitate these functions, such fill-measuring devices typically have an "attaching device" for attaching the drive device to the membrane rim, or to the housing in a manner which provides a rigid connection to the membrane rim.

A type of fill-measuring device is well known which has transmission means in the form of a tensile bolt which rests against the membrane. Such an arrangement has the drawbacks that:

it can lead to disadvantageous de-linking or diminishment of force transmission from/to the drive device, which drive device may comprise, e.g. a drive array of superposed piezoelectric elements; and it can lead to disadvantageous thermal expansion as a result of temperature effects, and to disadvantageous membrane deformation as a result of pressure effects.

DE 4429236 C2 describes a fill-measuring device in which a membrane shaft projects from the membrane in the rearward direction, and extends through the drive device, wherewith said shaft exerts a stress on the drive device from a side of the drive device which side is directed away from the membrane, said stress being directed in the direction toward the membrane. A drive end face of the drive device which end face is directed toward the membrane is applied against the membrane via its (said drive end face's) outer peripheral region, via the intermediary of rigid intermediate elements. This arrangement too has the abovementioned drawbacks:

it can lead to disadvantageous de-linking or diminishment of force transmission from/to the drive device; and it can lead to disadvantageous thermal expansion as a result of temperature effects, and to disadvantageous membrane deformation as a result of pressure effects.

DE 19814669 A1 describes a fill-measuring device in which the side of the drive device which side is directed away from the membrane rests exteriorly against a tubular housing. External pressure is employed to advantageously enhance the pre-stressing of the drive device. Here too, thermal changes give rise to thermal expansion, with deleterious effects via the piping or connections.

DE 10129556 A1 describes a fill-measuring device in which the drive device is surrounded by a cup-shaped body the open end of which is directed toward the membrane. The periphery of the cup-shaped body directed toward the membrane is connected to the membrane (according to one possible embodiment). The drive end face of the drive device which end face is directed toward the membrane is forced directly against the membrane, with the aid of the cup-shaped base of this cup-shaped structure. In particular, the superposed drive elements of the drive device are pressed against the border of the membrane via a tubular collar, as a result of which the application of external pressure can advantageously enhance the pre-stressing of the drive device. Such a collar, which may have a tubular or cup-shaped configuration, may optionally be designed such that thermal expansion of the drive device is compensated for to some extent. Unquestionably such an arrangement has some advantages, but it is difficult to fabricate and assemble a drive device having the described type of tubular configuration and cooperating with the described type of cup-shaped configuration. In addition, it is problematic to extend the conductor lines of the drive device rearward through the tubular or cup-shaped collar. (These conductor lines are essential for controlling the drive device and for transmitting signals generated by the drive device.)

In general, the fill-measuring devices according to the state of the art have a number of drawbacks. When an external pressure is applied, the stress on the superposed piezoelectric drive elements in the drive device is increased or decreased. This stress alteration immediately affects the frequency, amplitude, and other characteristics of the fill-measuring device, and thus affects its functionality. Temperature variations also have detrimental effects (increasing or decreasing effects) on the stress conditions in the superposed drive elements, which affects the frequency, amplitude, etc.

The underlying problem was to devise a fill-measuring device having a simple structure, which device enables the superposed drive piezoelectric elements to maintain their pre-stressing despite variations in temperature and pressure. In particular, variations in temperature and pressure or other external process conditions should have minimal influence on the measurement-relevant parameters, such as frequency, amplitude, pre-stressing, etc.

This problem is solved by a fill-measuring device for determining and/or monitoring the fill level of a container, which device has the features of a membrane which can be caused to vibrate, a rigid membrane rim in which the membrane is disposed; a drive device having a drive end face to impel the membrane into vibration, and/or to convert vibrations of the membrane into an electrical signal; and an attaching device for attaching the drive device to the membrane rim. A part of the attaching device is disposed in a region extending between the membrane and the drive end face of the drive device. At least one pressure transmission element is disposed between the membrane and the drive end face of the drive device, in a manner such that the membrane and the drive end face are coupled together for purposes of transmission of vibration.

A preferred fill-measuring device for determining and/or monitoring the fill level of a container has:

a membrane which can be caused to vibrate;

a rigid membrane rim in which the membrane is disposed;

a drive device having a drive end face to impel the membrane into vibration, and/or to convert vibrations of the membrane into an electrical signal; and an attaching device for attaching the drive device to the membrane rim.

Advantageously, in this fill-measuring device:

a part of the attaching device is disposed in a region extending between the membrane and the drive end face of the drive device; and at least one pressure transmission element (pressure force transmission element) is disposed between the membrane and the drive end face of the drive device, in a manner such that the membrane and the drive end face are coupled together for purposes of transmission of vibration.

In contrast to known concepts of fill-measuring devices wherein a tensile bolt drive presses against the membrane or against an intermediate base structure which surrounds the drive device, a configuration uses a superposed array of piezoelectric elements presses against a central bolt which is not directly connected to the membrane but rather is connected to the attaching device. In particular, the attaching device is in the form of a robust intermediate base structure, which attaching device presses against the membrane rim, particularly against the lower region of a housing or tube which is connected to the membrane rim. The connection of the drive device to the membrane rim may be accomplished via the intermediary of additional rigid elements, such as a housing, to which both the membrane (or membrane rim) and the attaching device are connected, with a distance being maintained between said membrane (or membrane rim) and said attaching device. In such a case, the attaching device may be regarded as a multi-part component. A critical feature is that a rigid connection to the membrane rim is provided via the attaching device.

In contrast to known tensile bolt drives in which there is pressing against the membrane or against an intermediate base element, there is no tensile force on the membrane center but only a compressive force. Advantageously, adjustments can be readily made at the time of assembly, so as to optimize the system as regards the thermal properties of the various components which are being installed.

Preferably, at least one part (or member) of the pressure transmission element extends through at least one throughgoing opening of the attaching device in a frictionless manner. Preferably the attaching device extends in the region between the drive end side of the drive device and the membrane, at a distance from the membrane, so that the membrane can vibrate without suffering any damping or other influence [sic] from the attaching device. The at least one pressure transmission element, serving as a pressure force transmitting element, extends through throughgoing openings in the attaching device (which attaching device serves as an intermediate base element) and engages, wherewith said pressure transmission element couples the drive device and the membrane for the purpose of transmission of vibrations from drive device to membrane or vice versa. In this way, drive forces can be transmitted from the drive device to the membrane via the pressure transmission element, and vibrations received by and amplified by the membrane can be transmitted from the membrane to the drive device. Advantageously, the openings, in the form of throughgoing openings, in the attaching device (which is serving as an intermediate base element), can also be utilized to align the attaching device during a welding operation, e.g. direct welding to the membrane. Such throughgoing openings are particularly advantageous in facilitating the supporting of the superposed drive elements on (against) the surfaces of the pressure transmission element which surfaces are directed toward said drive elements, such support being at a location which is [radially] not too distant from the center of said superposed drive elements.

As an alternative to such throughgoing openings, one may provide, e.g., lateral recesses in the attachment device, serving as an intermediate base element, which recesses allow passage of bar members on the pressure transmission element which bar members extend to the drive device. According to a configuration with a particularly simple structure, the attaching device may be in the form of a tensile element which is connected to the membrane rim, wherewith said attaching device is configured so as to extend around the pressure transmission element, to the side of said pressure transmission element, in a frictionless manner. Such an attaching device may be, e.g., bar-shaped or U-shaped, wherewith at least a part of the pressure transmission element extends around, so as to bypass the remaining attaching device (ex the recesses), near the wall region of said attaching device, and said part of said pressure transmission element continues toward the drive device. With such an embodiment, the attaching device may no longer be essentially disc-shaped but rather may be in the form of a robust bar, or half of such a bar.

A tensile element may be connected to the attaching device, which tensile element extends through the drive device and applies stress to the side of the drive device which is directed away from the membrane, which stress is directed toward said membrane. Preferably, the tensile element extends through the drive device from the region of the attaching device which region is located between the drive end face of the drive device and the membrane, and said tensile element applies stress to the side of the drive device which side is directed away from the membrane, said stress being applied to at least part of a surface of the pressure transmission element, and being directed toward the membrane.

Preferably, the pressure transmission element is attached to a membrane shaft which projects from the membrane in the direction of the drive device, said attachment being particularly by screwing. In this way, the stress can be applied to the drive end face from a central point or region of the membrane. It is particularly advantageous if the pressure transmission element achieves a central coupling of the membrane with a non-central coupling of the drive end face (via said pressure transmission element), because, with this configuration, by a pre-stressing one can particularly accurately provide the desired pressure forces to the center of the membrane. At the same time, the superposed piezoelectric elements in the drive device receive external pressure forces via the pressure piece (in the form of the pressure transmission element), which external forces are (have been) transmitted via the membrane, in a manner such that the received forces are distributed over the relatively large area of the drive end face. If the pressure transmission element is attached to the membrane via a threaded shaft, particularly a short threaded shaft which projects or extends out from the membrane surface, the configuration advantageously provides protection against rotation and provides means of centering.

The attaching device is preferably connected to the membrane rim. If this connection is a particularly rigid connection achieved by welding, this facilitates particularly accurate pre-stressing of the drive device against the membrane, via the attaching device, the tensile element, and the tightening nut, which pre-stressing can be easily adjusted with a screwing movement.

Preferably, the attaching device is disposed separately at a distance from the drive end face of the drive device, so that a vibration can be transmitted from the membrane to the drive end face via the pressure transmission element without impediment.

Preferably, the drive device comprises superposed piezoelectric elements, in a manner which is per se known.

The use of such a drive device facilitates adjustment for the thermal properties of the materials, such that thermal expansion of the components typically undergoing stress reduction (particularly the attaching device which is in the form of an intermediate base element, and the tensile element), and of the components typically undergoing stress increase (particularly the pressure transmission element which is in the form of a pressure piece, and the superposed piezoelectric elements of the drive device), can be compensated for. Such a compensation is also possible via, e.g., installation of rings in the array of superposed piezoelectric elements of the drive unit, which rings have a higher coefficient of thermal expansion than does the tensile element.

A fill-measuring device such as described offers numerous advantages. It is found that the described arrangement results in zero (or at least less) reduction in the pre-stressing of the piezoelectric elements in the event of changes in pressure or temperature (particularly in the event of "temperature shock"). In the case of tubular forms of the drive device with superposed piezoelectric elements, it is possible to provide for central screwing into the other components at the time of assembly, which facilitates said assembly (in a manner which is per se known). The purely central pre-stressing of the membrane improves mechanical performance, because the membrane receives less stressing. The attachment of the intermediate base which serves as the attaching device, which attachment is effected in the region of the membrane rim or border region, eliminates the influence of an external tube or the like on the drive device in the event of thermal expansion.

Certain exemplary embodiments will be described in appreciable detail hereinbelow, with reference to the accompanying drawings. In describing a given embodiment or variant, in general only differences between it and other embodiments or variants are described.

FIG. 2 is a perspective view of a part of the components on the forward side of the device according to FIG. 1, in a separated (disassembled) view;

FIG. 3 is a view analogous to FIG. 2, showing additional components;

FIG. 4 illustrates a modified embodiment; and

FIG. 5 illustrates another modified embodiment.

FIGS. 1-3 are various views of an exemplary fill-measuring device for determining and/or monitoring the fill level of, e.g., a container (or said Figures are at least views of certain components of such a fill-measuring device).

Figure 1:
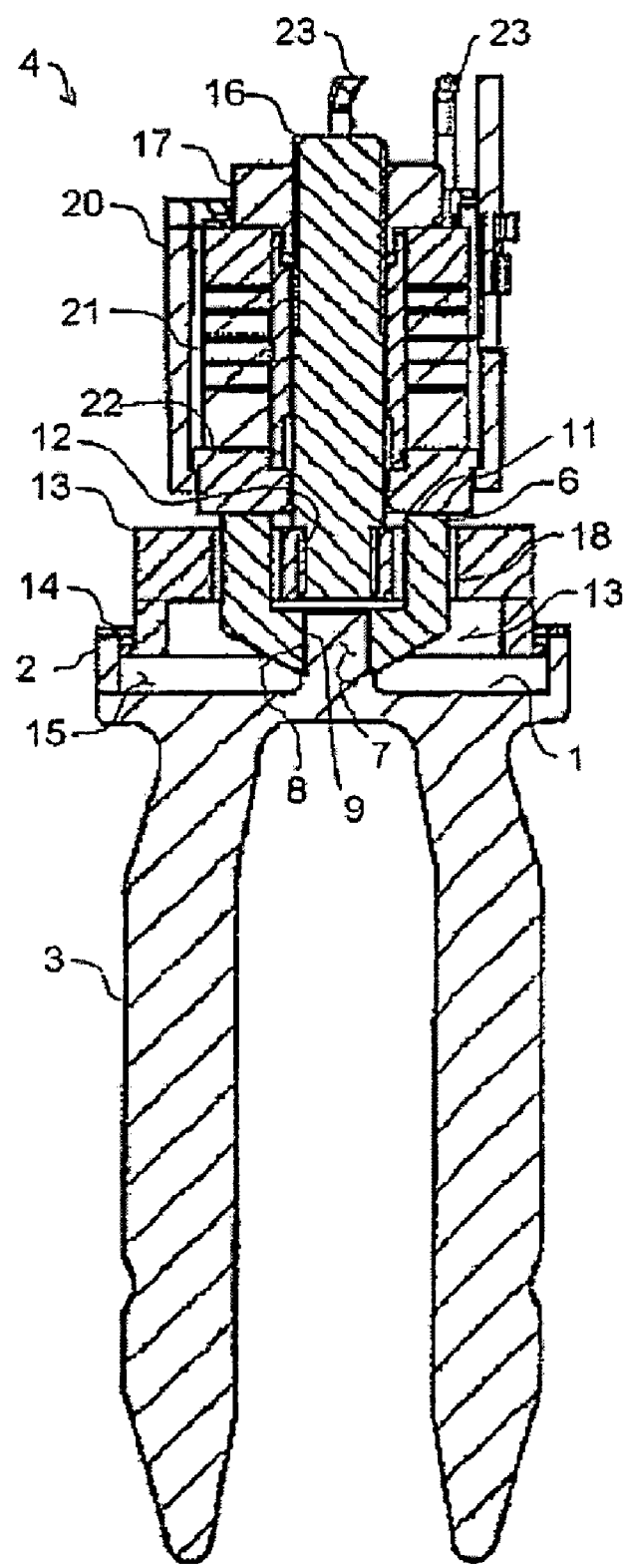
FIG. 1 is a cross sectional view of a fill-measuring device for determining and/or monitoring the fill level of a container, said device having a vibratable fork element on its forward side, which fork element extends from a membrane, and said device further having components for initiating vibration of the membrane.

Such a fill-measuring device is comprised of a membrane 1 which is mountable via its membrane rim 2 in a housing. This feature is per se known. The rigid membrane rim 2 surrounds the membrane 1 in a manner such that the membrane 1 can vibrate. In the forward direction, the membrane 1 has an oscillating body, in the form of, e.g., a fork element 3 which serves as an antenna for transmitting oscillations of the membrane 1 into the environment on the forward side, and also serves as a receiver for receiving oscillations from said environment, for transmission to the membrane 1. In the rearward direction, with respect to membrane 1, a drive device 4 is disposed, which device 4 presses against the membrane 1 via a forward-side drive end face 5, which drive end face 5 serves to transmit vibrations from the drive device 4 to the membrane and vice versa.

A pressure transmission element 6 (more accurately described as a pressure force transmission element or compressive force transmission element, as distinct from a tensile element or lateral force transmission element or torque transmission element), which is an essential component, is forcibly held between the drive device 4 (with its drive end face 5 directed toward the membrane 1) and the membrane 1. The pressure transmission element 6 couples the drive end face 5 and the membrane 1 (particularly as regards oscillations) and maintains them at a distance.

Preferably, the pressure transmission element 6 is configured such that it engages the membrane 1 centrally (to the extent possible) and in the forward direction, and thereby exerts a pressure force on a minimal central area of the membrane 1. On the opposite side of element 6 (facing the drive end face 5), the pressure transmission element 6 delivers pressure force to a maximally large surface of the drive end face 5. In particular, the pressure force is delivered to the drive end face 5 at a distance from the central axis of the drive device 4.

Preferably, the membrane 1 has a central "membrane shaft" 7 which extends in the rearward direction, which is fixedly mounted on the membrane 1 (or is of unit construction with membrane 1). In this connection, the pressure transmission element 6 can have a central bore directed toward the membrane 1, which bore extends around the membrane shaft 7, for centering the pressure transmission element 6. Particularly preferably, an arrangement is provided wherein the membrane shaft 7 has an exterior thread 8 which is engaged by a corresponding inner thread 9 in the bore of the pressure transmission element 6. In this way, the pressure transmission element 6 can be securely coupled to the membrane 1 by screwing it onto membrane 1.

In the rearward direction, the pressure transmission element 6 preferably has two or more bar members (10, 10) which provide the surface 11 of the pressure transmission element 6 which surface is directed toward the drive end face 5. With this configuration, the bar members (10, 10) of the pressure transmission element 6 are urged against the drive end face 5 of the drive device 4 at the locus of their bar member surfaces.

Another essential element of the fill-measuring device is an attaching device 13 which is designed and disposed to attach the drive device 4 directly or indirectly to the membrane rim 2. Preferably, the attaching device 13 is welded to the membrane rim 2 at its (device 13's) periphery 14. Optionally, other rigid components, e.g. a housing wall, may be interposed between the attaching device 13 (which is preferably generally disc-shaped) and the membrane rim 2, in such a way that the attaching device 13 is still fixedly connected to the membrane rim 2.

Between the main body of the attaching device 13, which attaching device preferably is in the form of a large, rigid, robust disc, and the rearward side of the membrane 1, a free space 15 is formed; thus there is a space between the rearward side of the membrane 1 and the attaching device 13, wherewith vibrations of the membrane 1 are not influenced by the attaching device 13.

In the rearward direction, directed away from the membrane 1, the attaching device 13 serves to fix a rearward face (rearward drive face) of the drive device 4, directed away from the membrane 1. For this purpose, according to a particularly preferred embodiment, a tensile element 16 which serves as an attaching element and may be in the form of a tensile rod, extends centrally rearwardly from the attaching device 13, through the drive device 4, and projects rearwardly out of the drive device 4. A tightening nut 17 screwed onto an outer thread disposed on a rearward region of the tensile element 16 provides a simple means of fixing and tensioning the tensile element 16 in the direction of the membrane 1. The pre-stressing of the drive device 4 against the pressure transmission element 6 and thereby against the membrane 1 can be adjusted by rotating the tightening nut 17. The tensioning element 16, which may be in the form of a tensioning rod or bolt, can be securely screwed to the attaching device 13 by way of threads 12 provided on its end region directed toward the attaching device 13.

In order to enable transmission of pressure forces and vibrations via the pressure transmission element 6, despite the presence of the attaching device 13 between the membrane 1 and the drive end face 5 of the drive device, according to a particularly preferred embodiment the attaching device 13 has throughgoing openings 18 through which the bar members (10, 10) of the pressure transmission element 6 extend. The dimensioning of the openings 18 relative to the peripheries of the bar members (10, 10) is arranged such that preferably the bar members (10, 10) do not contact the walls of the openings 18, and thus there is no friction generated. The bar members (10, 10) extend far enough through the throughgoing openings 18 of the attaching device 13 that an adequate separation is provided between the rearward surface of the attaching device 13 and the forward drive end face 5 of the drive device 4, to avoid contact between said end face 5 and the attaching device 13.

With such an arrangement, preferably a part of the attaching device 13 is disposed in a region located directly between the membrane 1 and the end face 5 of the drive device 4.

The drive device 4 is of a type which is per se known, comprised of a drive housing 20 in which a drive array of superposed piezoelectric elements 21 is disposed around a central opening through which the tensioning element 16 is passed, which tensioning element 16 serves for tensioning and stress transmission. Preferably, the drive end face 5 is not comprised of the end face of a forward piezoelectric element but is comprised of a separate transition element (or stressing element) 22. The drive array of piezoelectric elements 21 and the forward stressing element 22 are accommodated in the drive housing 20 in a manner so as to prevent them from falling out of said housing 20; at the same time, in the forward direction, said piezoelectric elements 21 and stressing element 22 are movably mounted in the housing 20, preferably by frictionless means. When a voltage is applied to conductors (23, 23) which are connected to the drive device 4 by customary means, the piezoelectric elements 21 can be excited so that they expand and/or contract, which produces vibrations which are transmitted to the membrane 1. In the opposite case of vibrations received by membrane 1 and transmitted to the piezoelectric elements 21, the piezoelectric elements 21 generate a signal therefrom which is sent via the conductors (23, 23) to an external evaluation circuit or control device.

FIG. 4 illustrates a modified embodiment, wherein, instead of a disc-shaped attaching device, an essentially bar-shaped alternative attaching piece 13* which has essentially an inverted U shape is disposed in a region between the drive end face 5 of the drive device 4 and the membrane 1.

FIG. 5 illustrates a different modified embodiment, wherein the bar-shaped piece according to FIG. 4 is truncated, to provide an attaching piece 13E (so labeled) wherein the bar element which connects the tensile element to the membrane rim 2 has been shortened, wherewith a bypass is provided around the pressure transmission element 6 on one side of said pressure transmission element 6.

The invention claimed is:

1. A fill-measuring device for determining and/or monitoring the fill level of a container, said device being comprised of:
   a membrane (1) which is configured to vibrate;
   a rigid membrane rim (2) in which the membrane (1) is disposed;
   a drive device (4) having a drive end face (5) capable of at least one of, impelling the membrane (1) into vibration, and converting vibrations of the membrane (1) into an electrical signal; and
   an attaching device (13) for attaching the drive device (4) to the membrane rim (2);
   characterized in that:
   a part of the attaching device (13) is disposed in a region extending between the membrane (1) and the drive end face (5) of the drive device (4); and
   at least one pressure transmission element (6) is disposed between the membrane (1) and the drive end face (5) of the drive device (4), in a manner such that the membrane (1) and the drive end face (5) are coupled together for purposes of transmission of vibration;
   wherein the pressure transmission element is attached to a membrane shaft which projects from the membrane in the direction of the drive device;
   and wherein the attaching device (13) is disposed in the region between the drive end face (5) of the drive device (4) and the membrane (1) in such a way as to be separated by a distance from said membrane (1).

2. A fill-measuring device according to claim 1, wherein at least one part or member of the pressure transmission element (6) extends through at least one throughgoing opening (18) of the attaching device (13) in a frictionless manner.

3. A fill-measuring device according to claim 1, wherein the attaching device (13°) connects a tensile element (16) with the membrane rim (2), and said attaching device (13°) is configured so as to extend around the pressure transmission element (6), to the side of said pressure transmission element (6), in a frictionless manner.

4. A fill-measuring device according to claim 1, wherein a tensile element (16) is attached to the attaching device (13), which tensile element (16) extends through the drive device (4) and applies stress to the side of the drive device (4) which is directed away from the membrane (1), which stress is directed toward said membrane (1).

5. A fill-measuring device according to claim 4, wherein the tensile element (16) extends through the drive device (4) from the region of the attaching device (13) which region is located between the drive end face (5) of the drive device (4) and the membrane (1), and said tensile element (16) applies stress to the side of the drive device (4) which side is directed away from the membrane (1), said stress being applied to at least part of a surface (11) of the pressure transmission element (6), and being directed toward the membrane (1).

6. A fill-measuring device according to claim 4, wherein the tensile element (16) is a tensile rod or tensile bolt which extends through an opening in the drive device (4).

7. A fill-measuring device according to claim 1, wherein the pressure transmission element (6) is attached to a membrane shaft (7) which projects from the membrane (1) in the direction of the drive device (4), said attachment being particularly by screwing.

8. A fill-measuring device according to claim 1, wherein the attaching device (13) is securely attached to the membrane rim (2), particularly by welding.

9. A fill-measuring device according to claim 1, wherein the attaching device (13) is disposed separately at a distance from the drive end face (5) of the drive device (4).

10. A fill-measuring device according to claim 1, wherein the drive device (4) is comprised of an array of superposed piezoelectric elements.

11. A fill-measuring device for determining and/or monitoring the fill level of a container, said device being comprised of:

a membrane (1) which is configured to vibrate;

a rigid membrane rim (2) in which the membrane (1) is disposed;

a drive device (4) having a drive end face (5) capable of at least one of, impelling the membrane (1) into vibration, and converting vibrations of the membrane (1) into an electrical signal; and an attaching device (13) for attaching the drive device (4) to the membrane rim (2);

characterized in that:

a part of the attaching device (13) is disposed in a region extending between the membrane (1) and the drive end face (5) of the drive device (4); and at least one pressure transmission element (6) is disposed between the membrane (1) and the drive end face (5) of the drive device (4), in a manner such that the membrane (1) and the drive end face (5) are coupled together for purposes of transmission of vibration;

wherein the pressure transmission element is attached to a membrane shaft which projects from the membrane in the direction of the drive device;

and wherein a tensile element (16) is attached to the attaching device (13), which tensile element (16) extends through the drive device (4) and applies stress to the side of the drive device (4) which is directed away from the membrane (1), which stress is directed toward said membrane (1).

12. A fill-measuring device according to claim 11, wherein at least one part or member of the pressure transmission element (6) extends through at least one throughgoing opening (18) of the attaching device (13) in a frictionless manner.

13. A fill-measuring device according to claim 11, wherein the attaching device (13°) connects a tensile element (16) with the membrane rim (2), and said attaching device (13°) is configured so as to extend around the pressure transmission element (6), to the side of said pressure transmission element (6), in a frictionless manner.

14. A fill-measuring device according to claim 11, wherein the tensile element (16) extends through the drive device (4) from the region of the attaching device (13) which region is located between the drive end face (5) of the drive device (4) and the membrane (1), and said tensile element (16) applies stress to the side of the drive device (4) which side is directed away from the membrane (1), said stress being applied to at least part of a surface (11) of the pressure transmission element (6), and being directed toward the membrane (1).

15. A fill-measuring device according to claim 11, wherein the tensile element (16) is a tensile rod or tensile bolt which extends through an opening in the drive device (4).

16. A fill-measuring device according to claim 11, wherein the pressure transmission element (6) is attached to a membrane shaft (7) which projects from the membrane (1) in the direction of the drive device (4), said attachment being particularly by screwing.

17. A fill-measuring device according to claim 11, wherein the attaching device (13) is securely attached to the membrane rim (2), particularly by welding.

18. A fill-measuring device according to claim 11, wherein the attaching device (13) is disposed separately at a distance from the drive end face (5) of the drive device (4).

19. A fill-measuring device according to claim 11, wherein the drive device (4) is comprised of an array of superposed piezoelectric elements.

\* \* \* \* \*